United States Patent
Mohebbinia et al.

(10) Patent No.: US 11,542,784 B2
(45) Date of Patent: *Jan. 3, 2023

(54) DIFFUSION FLUX INCLUSION FOR A RESERVOIR SIMULATION FOR HYDROCARBON RECOVERY

(71) Applicant: Landmark Graphics Corporation, Houston, TX (US)

(72) Inventors: Saeedeh Mohebbinia, Houston, TX (US); Terry Wayne Wong, Spring, TX (US)

(73) Assignee: Landmark Graphics Corporation, Houston, TX (US)

( * ) Notice: Subject to any disclaimer, the term of this patent is extended or adjusted under 35 U.S.C. 154(b) by 840 days.

This patent is subject to a terminal disclaimer.

(21) Appl. No.: 16/336,059

(22) PCT Filed: Aug. 2, 2017

(86) PCT No.: PCT/US2017/045104
§ 371 (c)(1),
(2) Date: Mar. 22, 2019

(87) PCT Pub. No.: WO2018/089060
PCT Pub. Date: May 17, 2018

(65) Prior Publication Data
US 2019/0271212 A1    Sep. 5, 2019

Related U.S. Application Data

(60) Provisional application No. 62/419,257, filed on Nov. 8, 2016, provisional application No. 62/419,230, filed on Nov. 8, 2016.

(51) Int. Cl.
*E21B 41/00* (2006.01)
*E21B 49/00* (2006.01)
(Continued)

(52) U.S. Cl.
CPC .......... *E21B 41/00* (2013.01); *E21B 41/0092* (2013.01); *E21B 43/166* (2013.01);
(Continued)

(58) Field of Classification Search
None
See application file for complete search history.

(56) References Cited

U.S. PATENT DOCUMENTS 5,925,598 A * 7/1999 Mody .................... C09K 8/845
507/140
6,196,318 B1   3/2001 Gong et al.
(Continued)

FOREIGN PATENT DOCUMENTS

WO     2016126252 A1    8/2016

OTHER PUBLICATIONS

CA Application Serial No. 3035733, First Office Action dated Mar. 10, 2020, 6 pages.
(Continued)

*Primary Examiner* — John J Figueroa
(74) *Attorney, Agent, or Firm* — Delizio, Peacock, Lewin & Guerra

(57) ABSTRACT

A method includes selecting a model for a simulation of hydrocarbon recovery from a reservoir having a plurality of fractures during injection of an injected gas into the plurality of fractures. Selecting the model includes determining a flux ratio of a convection rate to a diffusion rate for the reservoir, determining whether the flux ratio is less than a threshold, and in response to the flux ratio being less than the threshold, selecting the model that includes diffusion. Selecting the model includes performing the simulation of the hydrocarbon recovery from the reservoir based on the model.

11 Claims, 4 Drawing Sheets

(51) Int. Cl.
   *G06F 9/455*   (2018.01)
   *E21B 43/16*   (2006.01)
   *G06F 30/20*   (2020.01)
   *G06F 111/10*  (2020.01)
   *E21B 43/26*   (2006.01)

(52) U.S. Cl.
   CPC ............ *E21B 43/168* (2013.01); *E21B 49/00* (2013.01); *G06F 9/455* (2013.01); *G06F 30/20* (2020.01); *E21B 43/26* (2013.01); *G06F 2111/10* (2020.01)

(56) References Cited

U.S. PATENT DOCUMENTS

| | | | |
|---|---|---|---|
| 6,283,212 B1 | 9/2001 | Hinkel et al. | |
| 7,953,587 B2 * | 5/2011 | Bratton | E21B 43/00 703/10 |
| 8,150,669 B2 | 4/2012 | Cacas et al. | |
| 8,321,190 B2 | 11/2012 | Hansen et al. | |
| 9,863,885 B2 | 1/2018 | Zaretski et al. | |
| 10,366,185 B2 | 7/2019 | Lin et al. | |
| 10,551,520 B2 | 2/2020 | Saidian et al. | |
| 10,900,330 B2 * | 1/2021 | Mohebbinia | E21B 43/168 |
| 11,060,382 B2 * | 7/2021 | Sherman | C08K 3/08 |
| 2003/0060988 A1 | 3/2003 | Ginzburg | |
| 2005/0027499 A1 | 2/2005 | Bourbiaux et al. | |
| 2006/0020438 A1 | 1/2006 | Huh et al. | |
| 2007/0209799 A1 * | 9/2007 | Vinegar | B09C 1/02 166/302 |
| 2011/0060563 A1 | 3/2011 | Guenther et al. | |
| 2012/0221302 A1 | 8/2012 | Lewandowski et al. | |
| 2013/0218538 A1 | 8/2013 | Fu et al. | |
| 2014/0209390 A1 * | 7/2014 | Jamison | E21B 7/00 175/213 |
| 2015/0066445 A1 | 3/2015 | Lin et al. | |
| 2015/0066457 A1 | 3/2015 | Wu et al. | |
| 2016/0063150 A1 | 3/2016 | Safonov et al. | |
| 2016/0305237 A1 | 10/2016 | Klemin et al. | |
| 2018/0058211 A1 | 3/2018 | Liang et al. | |
| 2018/0253519 A1 | 9/2018 | Filippov et al. | |
| 2018/0329112 A1 | 11/2018 | Lee et al. | |
| 2018/0347328 A1 | 12/2018 | Aguilera et al. | |
| 2019/0218895 A1 | 7/2019 | Mohebbinia et al. | |
| 2019/0242233 A1 * | 8/2019 | Le Calvez | E21B 43/267 |
| 2019/0331812 A1 | 10/2019 | Liu et al. | |

OTHER PUBLICATIONS

Huysmans, et al., "Review of the Use of Peclet Numbers to Determine the Relative Importance of Advection and Diffusion in Low Permeability Environments", Hydrogeology Journal, Official Journal of the International Association of Hydrogeologists, Oct. 2004, 20 pages.
Kooijman, et al., "Estimation of Diffusion Coefficients in Multicomponent Liquid Systems", American Chemical Society, Industrial & Engineering Chemical Research, 30, 1991, pp. 1217-1222.
Leahy-Dios, et al., "Unified Model for Nonideal Multicomponent Molecular Diffusion Coefficients", AIChE Journal (American Institute of Chemical Engineers), vol. 53 No. 11, Nov. 2007, 8 pages.
Wit, et al., "Simulation of Gas/Oil Gravity Drainage in a Stack of Interacting Blocks: Pseudo Relations for a Limited Number of Gridblocks", Society of Petroleum Engineers, SPE Annual Technical Conference and Exhibition, 2002, 19 pages.
CA Application No. 3035730, First Office Action dated Mar. 10, 2020, 6 pages.
U.S. Appl. No. 16/334,416, Notice of Allowance, dated Jul. 7, 2020, 7 pages.
International Application Serial No. PCT/US2017/045071; International Search Report dated Nov. 9, 2017, 3 pages.
International Application Serial No. PCT/US2017/045071; Written Opinion dated Nov. 9, 2017, 5 pages.
Da Silva, et al., "Molecular Diffusion in Naturally Fractured Reservoirs: A Decisive Recovery Mechanism", Society of Petroleum Engineers, SPE Annual Technical Conference and Exhibition, Oct. 8-11, 1989, San Antonio, Texas, 14 pages.
Hoteit, "Modeling diffusion and gas-oil mass transfer in fractured reservoirs", Journal of Petroleum Science and Engineering vol. 105, pp. 1-17, May 2013.
Hoteit, et al., "Numerical Modeling of Diffusion in Fractured Media for Gas-Injection and -Recycling Schemes", Society of Petroleum Engineers, SPE Journal , vol. 14, Jun. 2009, pp. 323-337.
Hoteit, "Proper Modeling of Diffusion in Fractured Reservoirs", Society of Petroleum Engineers, SPE Reservoir Simulation Symposium, Feb. 21-23, 2011, The Woodlands, Texas, USA.
Moortgat, et al., "Fickian Diffusion in Discrete-Fractured Media from Chemical Potential Gradients and Comparison to Experiment", Energy & Fuels, (2013), 27(10): 5793-5805.
FR Application Serial No. 1759424, First Office Action, dated May 16, 2018, 2 pages.
PCT International Application Serial No. PCT/US2017/045104; International Search Report dated Nov. 9, 2017, 3 pages.
PCT International Application Serial No. PCT/US2017/045104; Written Opinion dated Nov. 9, 2017, 5 pages.

* cited by examiner

DIFFUSION FLUX INCLUSION FOR A RESERVOIR SIMULATION FOR HYDROCARBON RECOVERY

BACKGROUND

The disclosure generally relates to data processing for hydrocarbon recovery, and more particularly, to reservoir simulation for hydrocarbon recovery.

Reservoir simulations can predict the flow and phase behavior of the fluids in a reservoir to forecast production and injection quantities that include incremental hydrocarbon recovery, miscible-solvent requirement, solvent utilization efficiency, etc.

Reservoir simulations can assist to evaluate the enhanced oil recovery (EOR) processes including gas injection and chemical flooding. Gas injection in general is a promising option for EOR, particularly for fractured reservoirs, where there is a large contact area between the injected gas and fluid in place.

During gas injection recovery schemes, pressurized gas or fluid can be communicated from a wellbore into the reservoir at high pressure, and the pressurized gas displaces oil within the reservoir rock. The displaced oil and the injected gas can then be produced in production wellbores. Building a reliable model to represent these processes requires special features in the simulation. For example, the simulation can require models for molecular diffusion between the injected gas inside fractures and the fluids stored in the reservoir rock. However, the calculation of the molecular diffusion is usually an expensive and complicated process during simulation.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. In other instances, well-known structures and techniques have not been shown in detail in order not to obfuscate the description.

Various embodiments relate to simulations of oil recovery from petroleum reservoirs. Some embodiments include operations to identify the flow regime during gas injections in fractured media undergoing gravity drainage of oil in a petroleum reservoir. Operations can be performed to determine whether molecular diffusion is to be considered or included in the simulation for a specified reservoir and fluid condition. Accordingly, these simulations can be utilized to predict and optimize the recovery of oil from petroleum reservoirs.

Molecular diffusion can be an important factor in the hydrocarbon recovery from fractured reservoirs and can be especially important for gas injections in fractured media with low permeabilities, when gravitational drainage is inefficient. Ignoring diffusion in simulations can lead to underestimating the hydrocarbon recovery. Without diffusion, the injected gas flows mostly through the fractures, which causes early breakthrough. However, an effective flux (including both convection and diffusion flux) between the fractures and the matrix can be driven due to compositional gradients. Knowledge of the significance of diffusion flux relative to convection flux during a gas injection can be an effective factor in making decisions regarding hydrocarbon recovery from the reservoir. Convection flux can be so dominant in comparison to diffusion flux that the inclusion of diffusion in a model used during reservoir simulation can have only a marginal impact on the simulation results. In some embodiments, computational time can be conserved by switching between models that include or exclude diffusion based on the ratio of the convection flux to the diffusion flux.

In some embodiments, a result of the reservoir simulation can be used during an actual hydrocarbon recovery operation. For example, locations of either or both a gas injection well or a production well can be determined based on a result of the reservoir simulation. Additionally, either or both a rate and composition of an injection gas to be injected down the gas injection well during the hydrocarbon recovery operation can be based on result of the reservoir simulation.

Example System

Figure 1:
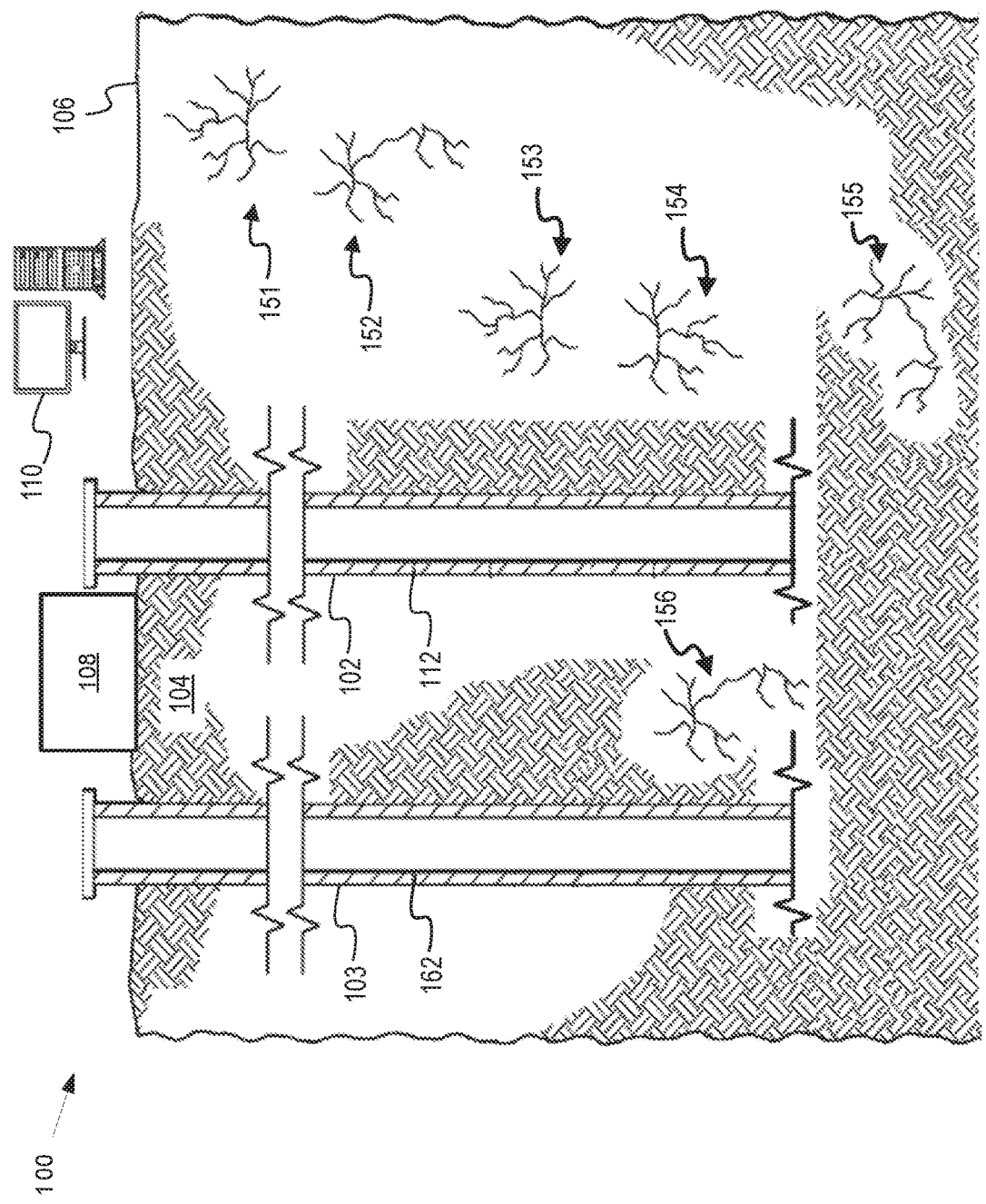
FIG. 1 depicts a schematic diagram of an example well system and a computing subsystem, according to some embodiments.

FIG. 1 depicts a schematic diagram of an example well system and a computing subsystem, according to some embodiments. A well system 100 includes an injection well 102 and a production well 103 in a subterranean region 104 beneath the ground surface 106. The injection well 102 and the production well 103 shown in FIG. 1 are depicted as vertical wellbores. However, some embodiments can be incorporated into well systems that include any combination of horizontal, vertical, slanted, curved, or other wellbore orientations. Also, while depicted with only one injection well and one production well, the well system 100 can include one or more additional treatment wells, observation wells, production wells, etc.

The computing subsystem 110 can include one or more computing devices or systems located at the injection well 102 and the production well 103 or other locations. The computing subsystem 110 or any of its components can be located apart from the other components shown in FIG. 1. For example, the computing subsystem 110 can be located at a data processing center, a computing facility, or another suitable location. The well system 100 can include additional or different features, and the features of the well system 100 can be arranged as shown in FIG. 1 or in another configuration.

The subterranean region 104 can include a reservoir that contains hydrocarbon resources such as oil, natural gas, or others. For example, the subterranean region 104 can include all or part of a rock formation (e.g., shale, coal, sandstone, granite, or others) that contain natural gas. The subterranean region 104 can include naturally fractured rock or natural rock formations that are not fractured to any significant degree. The subterranean region 104 can include tight gas formations that include low permeability rock (e.g., shale, coal, or others).

The well system 100 shown in FIG. 1 includes an injection system 108. The injection system 108 can be used to perform an injection treatment whereby a gas is injected into the subterranean region 104 in the injection well 102. For example, the injection system 108 can include an injection pump to inject treatment gas into the subterranean region 104 in the injection well 102. For example, a gas injection displacement process can be applied at a single injection location or at multiple injection locations in a subterranean zone, and the gas can be injected over a single time period or over multiple different time periods. In some instances, a gas injection recovery scheme can use multiple different gas injection locations in a single wellbore, multiple gas injection locations in multiple different wellbores, or any suitable combination thereof. Moreover, the gas injection recovery scheme can inject gas through any suitable type of wellbores such as, for example, vertical wellbores, slant wellbores, horizontal wellbores, curved wellbores, or combinations of these and others.

In response to the injection of treatment gas into the injection well 102 and because of gravity, reservoir fluids can flow into the production well 103 through a production conduit 162. The reservoir fluids can then be recovered from the production well 103. Although not shown, the well system 100 can also include production control systems and surface facilities to recover and process the reservoir fluids from the production well 103. The well system 100 can also include surface separation facilities, pipelines, storage facilities, etc. for further processing, storage, and transport of the reservoir fluids recovered from the production well 103. Additionally, the well system 100 can produce reservoir fluids and inject gas from multiple locations in the subterranean zone. Also, the production can occur at any point before, during, and after the injection of treatment gas. The production can also occur from multiple zones within the same wellbore. Additionally, while the well system 100 depicts a single production well, production can also occur from any combination of vertical, deviated, and horizontal wells.

Gas can be supplied from a truck with a compressor, or from a gas pipeline and surface compressor facilities. The treatment gas can be communicated through the injection well 102 from the ground surface 106 by an injection conduit 112 installed in the injection well 102. The production conduit 162 and the injection conduit 112 can include casing cemented to the wall of the injection well 102. In some implementations, all or a portion of the injection well 102 can be left open, without casing. The production conduit 162 and the injection conduit 112 can include a working string, coiled tubing, sectioned pipe, or other types of conduit.

The injection system 108 can also include surface and down-hole sensors to measure pressure, rate, temperature or other parameters of treatment or production. For example, the injection system 108 can include pressure meters or other equipment that measure the pressure in the injection well 102 at or near the ground surface 106 or at other locations. The injection system 108 can include pump controls or other types of controls for starting, stopping, increasing, decreasing or otherwise controlling pumping as well as controls for selecting or otherwise controlling gas pumped during the injection treatment. The injection system 108 can include an injection treatment control subsystem for communicating with the equipment to monitor and control the injection treatment.

The subterranean region 104 can include the natural fractures 151-156. Alternatively or in addition, a fluid injection treatment can also create fractures in the subterranean region 104, or further stimulate the natural fractures 151-156. Generally, the fractures can include fractures of any type, number, length, shape, geometry or aperture. Fractures can extend in any direction or orientation, and they can be formed at multiple stages or intervals, at different times or simultaneously. Fractures can extend through naturally fractured rock, regions of un-fractured rock, or both. The fractures can also be connected to the production system and can be the main conduit for production from the reservoir to the production wellbores.

In some implementations, the computing subsystem 110 can execute instructions to simulate the petroleum reservoir in the well system 100 during gas injection operations. The computing subsystem 110 can perform simulations before, during, or after the injection treatment. In some implementations, the injection treatment control subsystem controls the injection treatment based on simulations performed by the computing subsystem 110. For example, a pumping schedule or other aspects of a gas injection plan can be generated in advance based on simulations performed by the computing subsystem 110. As another example, the injection treatment control subsystem can modify, update, or generate a gas injection plan based on simulations performed by the computing subsystem 110 in real time during the injection treatment. In some implementations, the production control subsystem can control the production of existing wells, and the workover treatment of existing wells, and the drilling of new wells.

In some cases, the simulations are based on data obtained from the well system 100. For example, pressure meters, flow monitors, microseismic equipment, tiltmeters, or other equipment can perform measurements before, during, or after an injection treatment; and the computing subsystem 110 can perform the compositional reservoir simulation based on the measured data. In some cases, the injection treatment control subsystem can select or modify (e.g., increase or decrease) gas pressures, gas densities, gas compositions, and other control parameters based on data provided by the simulations. In some instances, data provided by the simulations can be displayed in real time during the injection treatment, for example, to an engineer or other operator of the well system 100.

Example Data

Figure 2:
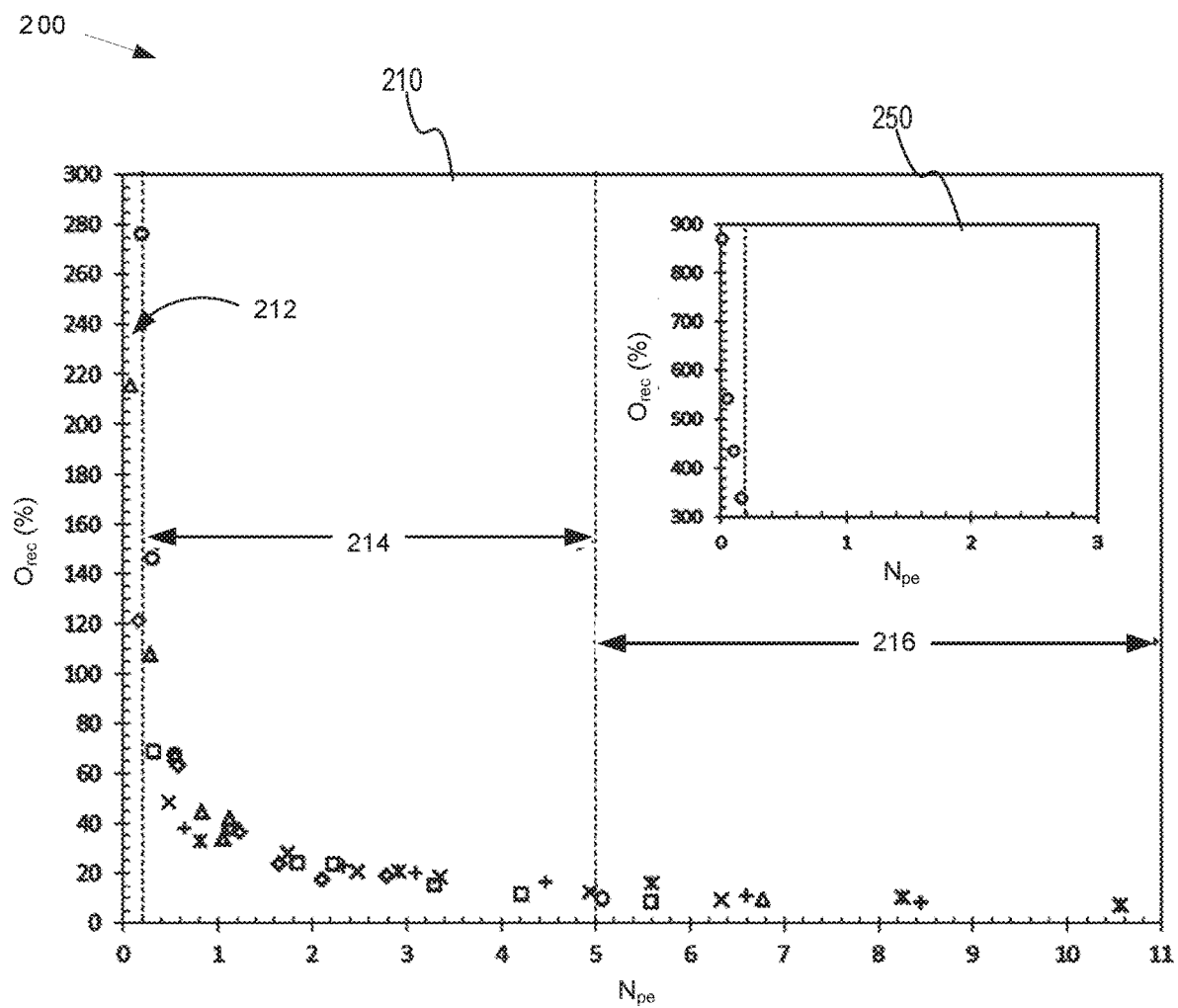
FIG. 2 depicts plots of oil recovery from a petroleum reservoir versus a Péclet number for the petroleum reservoir, according to some embodiments.

FIG. 2 depicts plots of oil recovery from a petroleum reservoir versus a Péclet number for the petroleum reservoir, according to some embodiments. The plots 200 can show a relationship between the oil recovery and a Péclet number for the petroleum reservoir. In some embodiments, a Péclet number is used to evaluate the relative strength of convective forces and diffusion forces during gas injection in a fractured hydrocarbon reservoir with gravity drainage as the driving force for oil production. The Péclet number can be a flux ratio and can be defined as the ratio of convection flux to diffusion flux and can be determined based on a combination of various physical parameters.

The plots 200 includes the outer plot 210 and the inset plot 250. Both plots show the Péclet number ($N_{pe}$ on the x-axis) versus the incremental oil recovery percentage ($O_{rec}$ on the y-axis), wherein the data points can be calculated for different sets of parameters. The inset plot 250 shows the oil recovery increase for lesser values of the Péclet number which were not shown on the outer plot 210.

The relationship between the Péclet number and the incremental oil recovery percentage can be divided into three zones corresponding with three different flow regimes: the diffusion-dominated zone 212, the transition zone 214, and the convection-dominated zone 216. Diffusion can have a significant effect on oil recovery in the diffusion-dominated zone 212. If the Péclet number is in the diffusion-dominated zone 212, diffusion in the diffusion-dominated zone should be included in a reservoir simulation. Diffusion forces can compete with convection forces and can have essentially the same effects on oil recovery in the transition zone 214. If the Péclet number is in the transition zone 214, diffusion in the transition zone 214 can be included in the reservoir simulation. Diffusion is dominated by convective forces in the convection-dominated zone 216, where diffusion can have a marginal effect on the oil recovery. If the Péclet number is in the convection-dominated zone 216, diffusion can be excluded from the reservoir simulation with minimal impact on the simulated oil recovery.

In some embodiments, the limits that define the diffusion-dominated zone 212, the transition zone 214, and convection-dominated zone 216 can vary. For example, the diffusion-dominated zone 216 can include all combinations of parameters that could result in a Péclet number that is less than or equal to 0.2. The transition zone 214 can include all combinations of parameters that could result in a Péclet number that is greater than 0.2 and less than 5.0. The convection-dominated zone can include all combinations of parameters that could result in a Péclet number that is greater than or equal to 5.0.

Example Operations

Figure 3:
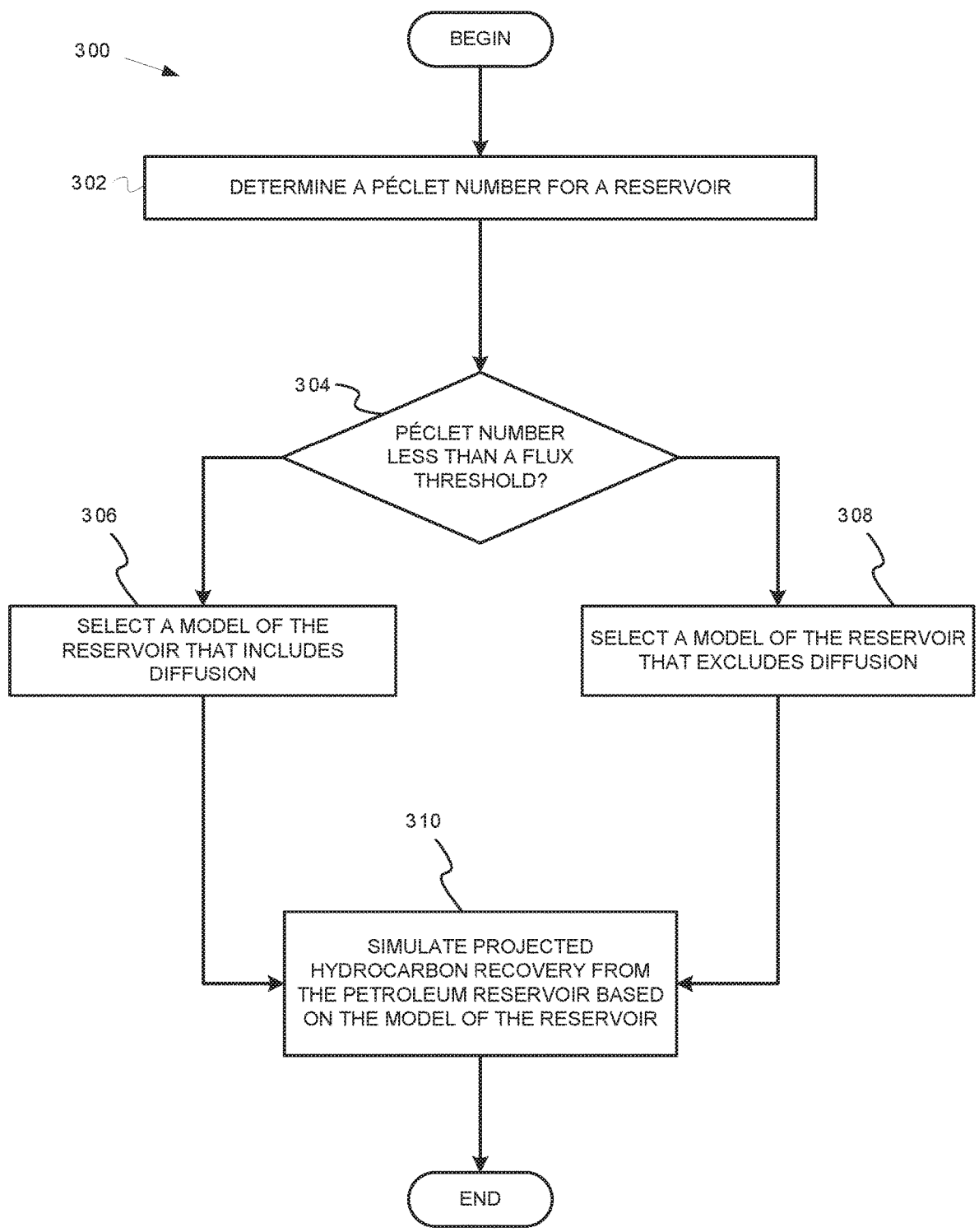
FIG. 3 depicts a flowchart of operations for selective inclusion of diffusion in a simulation of projected hydrocarbon recovery from a petroleum reservoir, according to some embodiments.

FIG. 3 depicts a flowchart of operations for selective inclusion of diffusion in a simulation of projected hydrocarbon recovery from a petroleum reservoir, according to some embodiments. Operations of a flowchart 300 can be performed by software, firmware, hardware or a combination thereof. For example, with reference to an example computer device depicted in FIG. 4 (further described below), a processor can execute instructions to perform operations of the flowchart 300. Operations of the flowchart 300 can be performed for any number of time intervals in a reservoir simulation system. Operations of the flowchart 300 start at block 302.

At block 302, a Péclet number for a reservoir is determined. The determination of the Péclet number is based, at least in part, on an estimated maximum diffusivity of the reservoir. In some embodiments, the Péclet number can be determined using Equation 1. Equation 1 includes an equation to determine the Péclet number based on a set of parameters, where $N_{pe}$ is the Péclet number, $\Delta\rho_{og}$ is a difference between the oil and gas densities, g is the gravitational acceleration, $K_m$ is a matrix permeability, l is a characteristic length of the system, $\phi_m$ is the matrix porosity, H is the height of a matrix block, $\mu_o$ is the oil viscosity, and D is the effective diffusion coefficient (e.g. an average diffusion coefficient):

$$N_{pe} = \frac{\text{Convection rate}}{\text{Diffusion rate}} \propto \frac{\text{Diffusion characteristic time } t_D}{\text{Convection characteristic time, } t_c} = \frac{\Delta\rho_{og} \; g \; K_m \; l_2}{\phi_m \; H \; \mu_o \; D} \quad (1)$$

As shown in Equation 1, the parameters can have proportional or inverse relationships with the Péclet number. Table 1 shows the effects that increasing the parameters on the right-hand side of Equation 1 can have on the Péclet number:

TABLE 1

Effect of different parameters on the flow regime in gas injection in fractured media

| Parameter | Effect on Péclet number |
| --- | --- |
| Matrix permeability, $K_m$ | increase |
| Fracture spacing, l | increase |
| Oil viscosity, $\mu_o$ | decrease |
| Matrix porosity, $\phi_m$ | decrease |
| Diffusion coefficient, D | decrease |
| Matrix block heights, H | decrease |
| Difference between densities of the fluids in matrix and fractures, $\Delta\rho_{og}$ | increase |

A matrix block can be defined as a simulated region of the rock/formation between fractures in the simulation. The dimensions of the matrix block can be determined by a set of distances between a plurality of fractures in a reservoir. For example, the dimensions of a matrix block can include a x-length between two fractures in the x-direction, a y-length between two fractures in the y-direction, and a z-length between two fractures in the z-direction. Determining the values of the parameters such as $\Delta\rho_{og}$, $K_m$, $\phi_m$, and $\mu_o$ can include looking up the parameter in a data table, solving an empirical equation to determine the parameter, determining the parameter based on sensor data, simulating experiments to determine parameter values, etc.

In some embodiments, parameters such as l can be based on the distance that molecules travel from the center of the matrix blocks to the fractures (i.e. fracture spacing). H is the effective height of the matrix block over which convective forces due to gravity drainage are calculated. The distance that molecules travels to the fractures can be based on the dimensions of the matrix block. In some embodiments, H can be equal to the z-length between two fractures in the z-direction. Alternatively, H can be different from the z-length between two fractures in the z-direction and represent a greater effective height of the matrix block. The characteristic length l can be determined as shown in Equation 2, where $l_x$ is the length of a matrix block in the x-direction, $l_y$ is the length of a matrix block in the y-direction, and $l_z$ is the length of a matrix block in the z-direction:

$$\frac{3}{l^2} = \frac{1}{(l_x)^2} + \frac{1}{(l_y)^2} + \frac{1}{(l_z)^2} \quad (2)$$

The effective diffusion coefficient (i.e. D in Equation 1) can be a function of the pressure, temperature and composition of the mixture. During gas injections, the composition of the fluids can continuously change. In some embodiments, determining D can include taking the composition of the fluids into account during gas injection. For example, to determine D for a gas composed of methane, ethane, propane, butane, and hydrogen sulfide, D can be determined through the use of an empirical equation of state (EOS).

In some embodiments, two premises can be leveraged to simplify the determination of the effective diffusivity during gas injection. The first premise is that the diffusion coefficient of the gaseous phase is usually much higher than the diffusion coefficient of the liquid phase within the reservoir. A higher diffusion coefficient of the gaseous phase can mean that the maximum diffusive flow happens in the gas phase. The second premise is that fresh injected gas/fluid can replace the gas phase within the reservoir. Replacement of the gas phase within the reservoir by fresh injected gas/fluid means that gas composition quickly approaches that of the injected gas/fluid. These two premises can result in an assumption that the majority of diffusion is occurring at a gaseous phase with a composition that is approximately that of the injected gas/fluid composition.

The assumption that the majority of diffusion is occurring in a gaseous phase and that the phase composition is similar to that of the injected gas/fluid can be used to determine a relationship for the Stefan-Maxwell (SM) diffusion coefficients. This relationship can become more accurate when the composition of a mixture approaches that of a pure component. The relationship for the SM diffusion coefficients can be represented by Equation 3, where $B_{ij}^{SM}$ is the auxiliary Stephan-Maxwell diffusion coefficients and $D_{i,1}^{\infty}$ is the infinite dilution diffusion coefficient of component i infinitely diluted in the injected gas (i.e. component 1):

$$\lim_{\substack{x_1 \to 1.0 \\ x_{i,i\neq 1} \to 0.0}} \begin{bmatrix} B_{11}^{SM} & \cdots & B_{1,n-1}^{SM} \\ \vdots & \ddots & \vdots \\ B_{n-1,1}^{SM} & \cdots & B_{n-1,n-1}^{SM} \end{bmatrix}^{-1} = \begin{bmatrix} D_{n,1}^{\infty} & \cdots & (D_{n,1}^{\infty} - D_{i,1}^{\infty}) & \cdots & 0 \\ & D_{2,1}^{\infty} & & & \\ \vdots & & \ddots & & \vdots \\ & & & D_{n-2,1}^{\infty} & \\ 0 & \cdots & & & D_{n-1,1}^{\infty} \end{bmatrix} \quad (3)$$

The elements of the matrix of infinite dilution diffusion coefficients can be determined from EOS properties derived from the matching of fluid experiments. The infinite dilution diffusion coefficients between injected gas and other hydrocarbons in the oil can be the same order of magnitude. When the infinite dilution diffusion coefficients are on the same order of magnitude, off-diagonal elements of the matrix such as the difference terms such as $(D_{n,1}^{\infty} - D_{i,1}^{\infty})$ can give a negligible diffusive flux. If the off-diagonal elements of the matrix of infinite dilution diffusion coefficients give a negligible diffusive flux, calculations of the flux using the off-diagonal elements can be ignored. This can result in an approximation of Equation 3 into the form of Equation 4, wherein both the matrix including auxiliary SM diffusion coefficients and the matrix including infinite dilution diffusion coefficients are diagonal matrices:

$$\lim_{\substack{x_1 \to 1.0 \\ x_{i,i\neq 1} \to 0.0}} \begin{bmatrix} B_{11}^{SM} & \cdots & 0 \\ \vdots & \ddots & \vdots \\ 0 & \cdots & B_{n-1,n-1}^{SM} \end{bmatrix}^{-1} = \begin{bmatrix} D_{n,1}^{\infty} & \cdots & 0 & \cdots & 0 \\ & D_{2,1}^{\infty} & & & \\ \vdots & & \ddots & & \vdots \\ & & & D_{n-2,1}^{\infty} & \\ 0 & \cdots & & & D_{n-1,1}^{\infty} \end{bmatrix} \quad (4)$$

In some embodiments, properties of a component that is abundant in the oil phase can be used to obtain an estimated maximum diffusivity at an average temperature and pressure of the reservoir simulation system. For example, if the most abundant components in the gas and oil phases of the reservoir simulation system are components A and B respectively, the value of D can be approximated as the infinite dilution diffusion coefficient of component A infinitely diluted in component B. This approximation can be represented in Equation 5, where D is the effective diffusion coefficient, $D_{B,A}^{\infty}|_{\overline{T},\overline{P}}$ is the estimated maximum diffusivity, and the subscripts $\overline{T}$ and $\overline{P}$ denote that the estimated maximum diffusivity is being determined at the average temperature and average pressure of the reservoir simulation system, respectively:

$$D \approx D_{B,A}^{\infty}|_{\overline{T},\overline{P}} \quad (5)$$

$D_{B,A}^{\infty}|_{\overline{T},\overline{P}}$ can be measured in a laboratory, estimated from empirical formulas, determined from a data table, or determined from results of a computer simulation. In some embodiments, $D_{B,A}^{\infty}|_{\overline{T},\overline{P}}$ can be determined from common EOS parameters which are developed in the normal process of characterizing reservoir fluids from standard laboratory fluid tests. A processor (e.g., software executing therein) can be used to solve an EOS to determine $D_{B,A}^{\infty}|_{\overline{T},\overline{P}}$. Once $D_{B,A}^{\infty}|_{\overline{T},\overline{P}}$ has been determined, the Péclet number can be determined by substituting D in Equation 4 with $D_{B,A}^{\infty}|_{\overline{T},\overline{P}}$ to form the approximation of the Péclet number shown in Equation 6:

$$N_{Pe} \approx \frac{\Delta \rho_{og} \ g \ K_m \ l_2}{\phi_m \ H \ \mu_o \ D_{B,A}^{\infty}|_{\overline{T},\overline{P}}} \quad (6)$$

Thus, for the operation at block 302, a Péclet number for a reservoir can be determined using Equation 6 based in part on an estimated maximum diffusivity.

At block 304, a determination is made of whether the Péclet number is less than a threshold. The threshold can be any value greater than one. For example, the threshold can be 5.0. The Péclet number can be used within a standalone tool to estimate the significance of diffusion on oil recovery for a given reservoir condition and injected gas properties. The Péclet number can be particularly useful in determining whether to include diffusion calculations in simulations of gas injections. If the Péclet number is less than a threshold value, operations of the flowchart 300 continue at block 306. Otherwise operations of the flowchart 300 continue at block 308.

At block 306, a model of the reservoir that includes diffusion is selected. As described above, the diffusion can be added to the model of the petroleum reservoir because convection is not dominating the diffusion. Thus, diffusion can have a significant effect on oil recovery. A petroleum reservoir with a significant effect of diffusion can use a model of the flux that can be more accurate when the model includes a convection component and a diffusion component. For example, a model with a convection component and a diffusion component can include a model wherein the reservoir can be separated into a number of three-dimensional grid cells. In some embodiments, each face of a grid cell satisfies the standard convection-diffusion equations shown in Equation 7, 8, and 9 where t is the time, $\phi$ is the porosity, $\rho_j$ is the density of phase j, $S_j$ is the saturation of phase j, $x_{ij}$ is the mole fraction of component i in phase j, $\vec{v}_j$ is the velocity vector of phase j, np is the number of phases, nc is the number of components, $J_{ij}$ is the diffusive flux of component i in phase j, $Q_i$ is the source/sink of component i, R is the universal gas constant, T is the temperature in absolute units, $(B^{SM})_{ik,j}^{-1}$ is the Stefan-Maxwell diffusion coefficient for component pair i and k in phase j, and $\mu_{kj}$ is the chemical potential of component k in phase j, v is a velocity field, and S is a source or sink of the gas:

$$\frac{\partial}{\partial t}\left(\phi \sum_{j=1}^{np} \rho_j S_j x_{ij}\right) = \nabla \cdot \left(\sum_{j=1}^{np} \rho_j x_{ij} \vec{v}_j\right) - \nabla \cdot \left(\sum_{j=1}^{np} J_{ij}\right) + Q_i, \quad (7)$$

$i = 1, \ldots, nc$ and $$J_{ij} = -\frac{\phi \, S_j \, \rho_j}{RT} \sum_{k=1}^{n_c-1} (B^{SM})_{ik,j}^{-1} x_{kj} \nabla \mu_{kj} \quad i = 1, \ldots, n_c - 1 \text{ and} \quad (8)$$

$$J_{nc,j} = -\sum_{k=1}^{n_c-1} J_{k,j} \quad (9)$$

At block 308, a model of the reservoir that excludes diffusion is selected. As described above, the diffusion can be excluded from the model of the petroleum reservoir because the convection is dominating the diffusion. Thus, diffusion can have a negligible effect on oil recovery. A petroleum reservoir with a negligible effect of diffusion can use a model of the flux that can remain accurate when the model includes a convection component and excludes a diffusion component. For example, a model with a convection component that excludes a diffusion component can include a model wherein the reservoir can be separated into a number of three-dimensional grid cells. In some embodiments, each face of a grid cell satisfies the standard convection equation shown in Equation 10:

$$\frac{\partial}{\partial t}\left(\phi \sum_{j=1}^{np} \rho_j S_j x_{ij}\right) = \nabla \cdot \left(\sum_{j=1}^{np} \rho_j x_{ij} \vec{v}_j\right) Q_i, i = 1, \ldots, nc \quad (10)$$

At block 310, the projected hydrocarbon recovery from the petroleum reservoir is simulated based on the model of the reservoir. As described above, the model may or may not include diffusion based on the value of the Péclet number for the petroleum reservoir. Additionally, in some embodiments, the Péclet number can be used to perform sensitivity analysis on each parameter reported in Table 1. This sensitivity analysis can be used to optimize the injected gas properties and reservoir characteristics such as fracture spacing or gas composition. Operations of the flowchart 300 are complete.

In some embodiments, operations and output from the flowchart 300 can be used in actual gas injection operations or well location planning for actual hydrocarbon recovery. For example, changing the gas composition of the injected gas can change the estimated maximum diffusivity. Changing the estimated maximum diffusivity between a plurality of compositions can result in different estimated oil recoveries. In some embodiments, the correlation between operational parameters and estimated oil recovery can be used to determine optimal operational parameters. For example, operational parameters can include controllable parameters such as the gas injection schedule, gas injection rate, composition of an injected gas, characteristic length generated from a well stimulation treatment, etc. The parameter or set of parameters that result in a maximum estimated oil recovery or greatest rate of estimated oil recovery can be selected as the optimal operational parameters for oil recovery at the well. In some embodiments, the correlation between geologic parameters and the estimated oil recovery can be used to optimize locations at which to drill at least one of a production well and a gas injection well. Geologic parameters can include matrix permeability, characteristic length, matrix porosity, etc. For example, selecting different grid cells as production well positions or injection well positions can provide different estimates of oil recovery based on the geologic parameters at or near the grid cell. An optimal production well position or injection well position can be determined based on a maximum estimated oil recovery.

Example Computer Device

Figure 4:
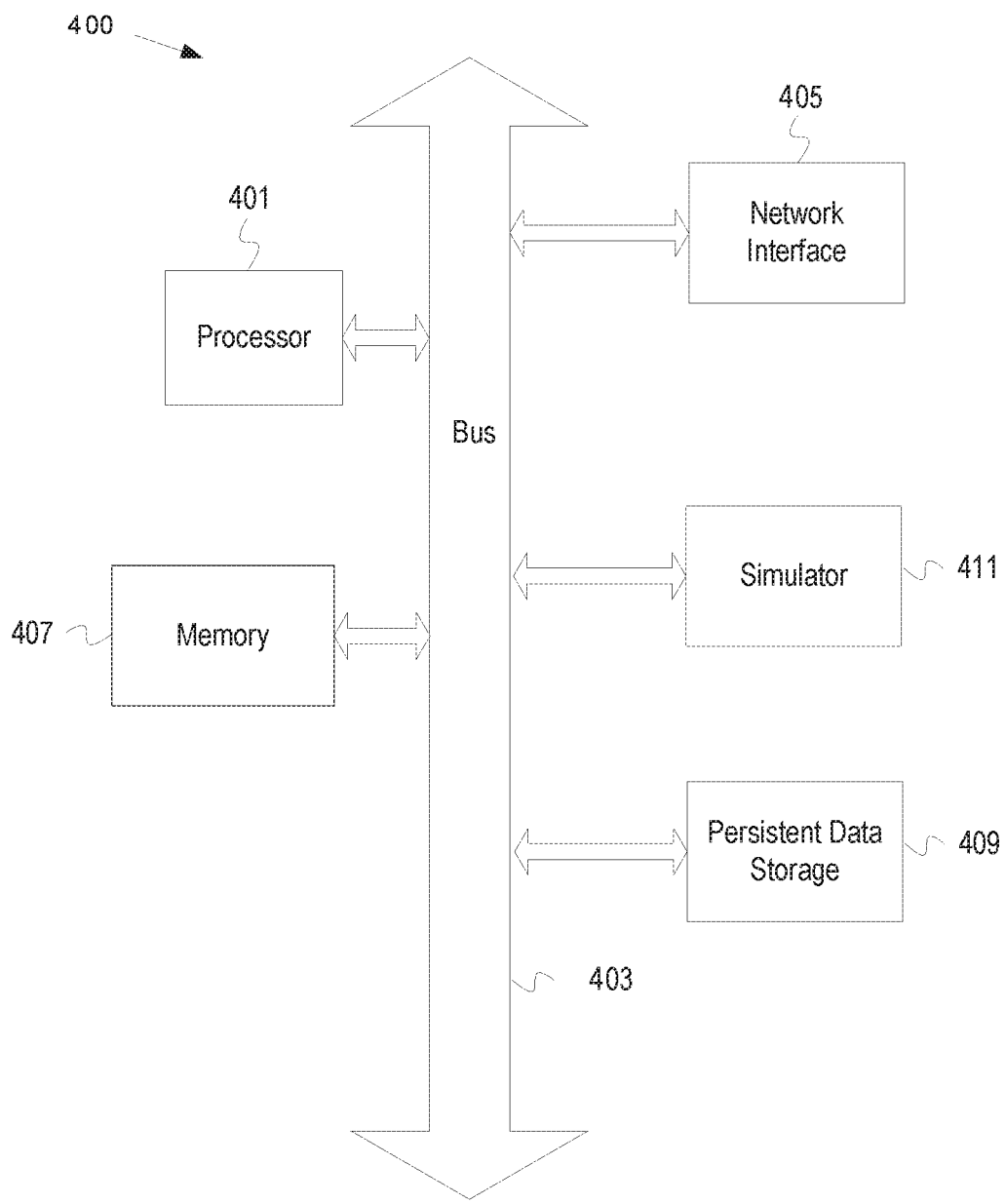
FIG. 4 depicts an example computer device, according to some embodiments.

FIG. 4 depicts an example computer device, according to some embodiments. The computer device depicted in FIG. 4 can be an example of at least part of the computing subsystem 110 depicted in FIG. 1. The computer device includes a processor 401 (possibly including multiple processors, multiple cores, multiple nodes, and/or implementing multi-threading, etc.). The computer device includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The computer device also includes a persistent data storage 409. The persistent data storage 409 can be a hard disk drive, such as magnetic storage device. The computer device also includes a bus 403 (e.g., PCI, ISA, PCI-Express, HyperTransport® bus, InfiniBand® bus, NuBus, etc.) and a network interface 405 (e.g., a Fiber Channel interface, an Ethernet interface, an internet small computer system interface, SONET interface, wireless interface, etc.).

The computer device also includes a simulator 411. The simulator 411 can perform any of the operations, as described above. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401, the network interface 405, and the persistent data storage 409 are coupled to the bus 403. Although illustrated as being coupled to the bus 403, the memory 407 may be coupled to the processor 401.

The flowchart is provided to aid in understanding the illustrations and are not to be used to limit scope of the claims. The flowchart depicts example operations that can vary within the scope of the claims. Additional operations may be performed; fewer operations may be performed; the operations may be performed in parallel; and the operations may be performed in a different order. It will be understood that at least some of blocks of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized herein. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing. Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine-readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

EXAMPLE EMBODIMENTS

Example embodiments include the following:

Embodiment 1

A method comprising: Selecting a model for a simulation of hydrocarbon recovery from a reservoir having a plurality of fractures during injection of an injected gas into the plurality of fractures, wherein selecting the model comprises, determining a flux ratio of a convection rate to a diffusion rate for the reservoir; determining whether the flux ratio is less than a threshold; and in response to the flux ratio being less than the threshold, selecting the model that includes diffusion; and performing the simulation of the hydrocarbon recovery from the reservoir based on the model.

Embodiment 2

A method of Embodiment 1, wherein the flux ratio is based, at least in part, on a diffusion coefficient that is equated to an estimated maximum diffusivity of the reservoir.

Embodiment 3

A method of Embodiments 1 or 2, wherein selecting the model comprises: in response to the flux ratio being greater than or equal to the threshold, excluding the diffusion from the modeling.

Embodiment 4

A method of any of Embodiments 1-3, wherein the flux ratio increases as a distance between the plurality of fractures increases.

Embodiment 5

A method of any of Embodiments 1-4, further comprising: drilling at least one of an injection well and a production well in the reservoir at a location that is based, at least in part, on a result of the simulation.

Embodiment 6

A method of any of Embodiments 1-5, further comprising: injecting the injected gas into an injection well at a rate that is based, at least in part, on a result of the simulation.

Embodiment 7

A method of any of Embodiments 1-6, further comprising: injecting the injected gas into an injection well, wherein a composition of the injected gas that is based, at least in part, on a result of the simulation.

Embodiment 8

One or more non-transitory machine-readable storage media comprising program code for a simulation of hydrocarbon recovery, the program code to:
create a model for a simulation of hydrocarbon recovery from a reservoir having a plurality of fractures during injection of an injected gas into the plurality of fractures, wherein the program code to create the model comprises program code to determine whether to include diffusion in the model, wherein the program code to determine whether to include the diffusion in the model comprises program code to, determine a flux ratio of a convection rate to a diffusion rate for the reservoir; in response to a determination that the flux ratio is less than or equal to a first flux threshold, define the reservoir as a diffusion dominated zone; in response to a determination that the flux ratio is greater than the first flux threshold and less than a second flux threshold, define the reservoir as a transition zone; in response to a determination that the flux ratio is greater than or equal to the second flux threshold, define the reservoir as a convection dominated zone; and in response to the reservoir being defined as at least one of the diffusion dominated zone and the transition zone, add the diffusion to the model; and perform the simulation of the hydrocarbon recovery from the reservoir based on the model.

Embodiment 9

One or more non-transitory machine-readable storage media of Embodiment 8, wherein program code to determine whether to include the diffusion in the model comprises program code to: in response to the reservoir being defined as the convection dominated zone, removing the diffusion from the model.

Embodiment 10

One or more non-transitory machine-readable storage media of Embodiments 8 or 9, wherein the flux ratio increases as a distance between the plurality of fractures increases.

Embodiment 11

One or more non-transitory machine-readable storage media of any of Embodiments 8-10, wherein the flux ratio decreases as at least one of the following increases: a matrix porosity of the reservoir, and a viscosity of oil in the reservoir.

Embodiment 12

One or more non-transitory machine-readable storage media of any of Embodiments 8-11, further comprising program code to: determine a location to drill at least one of an injection well and a production well in the reservoir for hydrocarbon recovery based, at least in part, on a result of the simulation.

Embodiment 13

One or more non-transitory machine-readable storage media of any of Embodiments 8-12, further comprising program code to: determine, based, at least in part, on a result of the simulation, a rate of injection of the injected gas into an injection well to recover hydrocarbons from the reservoir via a production well.

Embodiment 14

One or more non-transitory machine-readable storage media of any of Embodiments 8-13, further comprising program code to: determine, based, at least in part, on a result of the simulation, a composition of the injected gas to be injected into an injection well to recover hydrocarbons from the reservoir via a production well.

Embodiment 15

A system comprising: a processor; and a machine-readable medium having program code executable by the processor to cause the processor to, create a model for a simulation of hydrocarbon recovery from a reservoir having a plurality of fractures during injection of an injected gas into the plurality of fractures, wherein the program code executable by the processor to cause the processor to create the model comprises program code executable by the processor to cause the processor to determine whether to include diffusion in the model, wherein the program code executable by the processor to cause the processor to determine whether to include the diffusion in the model comprises program code executable by the processor to cause the processor to, determine a flux ratio of a convection rate to a diffusion rate for the reservoir; determine whether the flux ratio is less than a threshold; and in response to the flux ratio being less than the threshold, add the diffusion to the model; and perform the simulation of the hydrocarbon recovery from the reservoir based on the model.

Embodiment 16

A system of embodiment 15, wherein the flux ratio is based, at least in part, on a diffusion coefficient that is equated to an estimated maximum diffusivity of the reservoir.

Embodiment 17

A system of embodiments 15 or 16, wherein the program code executable by the processor to cause the processor to determine whether to include the diffusion for the modeling comprises program code executable by the processor to cause the processor to: in response to the flux ratio being greater than or equal to the threshold, exclude the diffusion from the modeling.

Embodiment 18

A system of any of embodiments 15-17, wherein the flux ratio increases as a distance between the plurality of fractures increases, and wherein the flux ratio decreases as at least one of the following increases: a matrix porosity of the reservoir, and a viscosity of oil in the reservoir.

Embodiment 19

A system of any of embodiments 15-18, wherein the program code comprises program code executable by the processor to cause the processor to: determine a location to drill at least one of an injection well and a production well in the reservoir for hydrocarbon recovery based, at least in part, on a result of the simulation.

Embodiment 20

A system of any of embodiments 15-19, further comprising: an injection pump to pump the injected gas at a rate down the injection well to produce hydrocarbons from the reservoir, wherein the rate and a composition of the injected gas is based, at least in part, on the result of the simulation.

What is claimed is:

1. One or more non-transitory machine-readable storage media comprising program code for a simulation of hydrocarbon recovery, the program code to:
   create a model for a simulation of hydrocarbon recovery from a reservoir having a plurality of fractures during injection of an injected gas into the plurality of fractures, wherein the program code to create the model comprises program code to determine whether to include diffusion in the model, wherein the program code to determine whether to include the diffusion in the model comprises program code to,
      determine a flux ratio of a convection rate to a diffusion rate for the reservoir;
      in response to a determination that the flux ratio is less than or equal to a first flux threshold, define the reservoir as a diffusion dominated zone;
      in response to a determination that the flux ratio is greater than the first flux threshold and less than a second flux threshold, define the reservoir as a transition zone;
      in response to a determination that the flux ratio is greater than or equal to the second flux threshold, define the reservoir as a convection dominated zone; and
      in response to the reservoir being defined as at least one of the diffusion dominated zone and the transition zone, add the diffusion to the model, and in response to the reservoir being defined as the convection dominated zone, removing the diffusion from the model; and
   perform the simulation of the hydrocarbon recovery from the reservoir based on the model.

2. The one or more non-transitory machine-readable storage media of claim 1, wherein the flux ratio increases as a distance between the plurality of fractures increases.

3. The one or more non-transitory machine-readable storage media of claim 1, wherein the flux ratio decreases as at least one of the following increases: a matrix porosity of the reservoir, and a viscosity of oil in the reservoir.

4. The one or more non-transitory machine-readable storage media of claim 1, further comprising program code to:
   determine a location to drill at least one of an injection well and a production well in the reservoir for hydrocarbon recovery based, at least in part, on a result of the simulation.

5. The one or more non-transitory machine-readable storage media of claim 1, further comprising program code to:
   determine, based, at least in part, on a result of the simulation, a rate of injection of the injected gas into an injection well to recover hydrocarbons from the reservoir via a production well.

6. The one or more non-transitory machine-readable storage media of claim 1, further comprising program code to:
   determine, based, at least in part, on a result of the simulation, a composition of the injected gas to be injected into an injection well to recover hydrocarbons from the reservoir via a production well.

7. A system comprising:
   a processor; and
   a machine-readable medium having program code executable by the processor to cause the processor to,
      create a model for a simulation of hydrocarbon recovery from a reservoir having a plurality of fractures during injection of an injected gas into the plurality of fractures, wherein the program code executable by the processor to cause the processor to create the model comprises program code executable by the processor to cause the processor to determine whether to include diffusion in the model, wherein the program code executable by the processor to cause the processor to determine whether to include the diffusion in the model comprises program code executable by the processor to cause the processor to,
         determine a flux ratio of a convection rate to a diffusion rate for the reservoir;
         determine whether the flux ratio is less than a threshold; and
         in response to the flux ratio being less than the threshold, add the diffusion to the model and in response to the flux ratio being greater than or equal to the threshold, exclude the diffusion from the modeling; and
      perform the simulation of the hydrocarbon recovery from the reservoir based on the model.

8. The system of claim 7, wherein the flux ratio is based, at least in part, on a diffusion coefficient that is equated to an estimated maximum diffusivity of the reservoir.

9. The system of claim 7,
   wherein the flux ratio increases as a distance between the plurality of fractures increases, and
   wherein the flux ratio decreases as at least one of the following increases: a matrix porosity of the reservoir, and a viscosity of oil in the reservoir.

10. The system of claim 7, wherein the program code comprises program code executable by the processor to cause the processor to:
    determine a location to drill at least one of an injection well and a production well in the reservoir for hydrocarbon recovery based, at least in part, on a result of the simulation.

11. The system of claim 10, further comprising:
    an injection pump to pump the injected gas at a rate down the injection well to produce hydrocarbons from the reservoir, wherein the rate and a composition of the injected gas is based, at least in part, on the result of the simulation.

* * * * *